Patented Sept. 24, 1935

2,015,260

UNITED STATES PATENT OFFICE 2,015,260

PROCESS FOR BREAKING PETROLEUM EMULSIONS

Melvin De Groote, St. Louis, Mo., assignor to Tretolite Company, Webster Groves, Mo., a corporation of Missouri No Drawing. Application May 9, 1935, Serial No. 20,629

11 Claims. (Cl. 196—4)

This invention relates to the treatment of emulsions of mineral oil and water, such as petroleum emulsions, for the purpose of separating the oil from the water.

Petroleum emulsions are of the water-in-oil type, and consist of oil constituting the continuous phase of the emulsion, droplets of water distributed throughout the body of oil and constituting the dispersed phase of the emulsion, and films of matter that encase the droplets of water. They are obtained from wells and from the bottom of oil storage tanks, and are commonly referred to as "cut oil", "roily oil", "emulsified oil" and "bottom settlings".

The object of my present invention is to provide a novel and inexpensive process for separating emulsions of the character referred to into their component parts of oil and water or brine.

Briefly described, my process consists in subjecting a petroleum emulsion to the action of a treating agent comprising a precipitated, finely-divided, normally inert, water-insoluble, inorganic solid, together with an adsorbed organic demulsifying agent. The combination constituting said treating agent is obtained by precipitation, as a result of decomposition or metathesis in presence of a polar, surface-active, water-soluble, sulfo-organic, chemical compound, of the kind which is characterized by the fact that its alkaline earth salts are water-soluble and also characterized by the fact that its molecular weight range is within the approximate limit of 150 to 450.

The word "sulfo" is herein used in its conventional sense to indicate the presence in the organic compound of a sulfate or sulfonic acid radical, i. e., an $HSO_4$ radical, or $HSO_3$ radical, or the equivalent, wherein the acidic hydrogen is replaced by an inorganic radical, such as a metal or ammonium radical, or basic amine radical, such as triethanolamine radical, or the like, as ($NaSO_3$), ($NaSO_4$), ($KSO_3$), ($KSO_4$), ($NH_4SO_3$), ($NH_4SO_4$), etc. The expression "inert, water-insoluble, inorganic solid" is herein used to indicate such materials as calcium carbonate, magnesium carbonate, basic magnesium carbonate, calcium sulfate, barium sulfate, etc. Generally speaking, these materials have little or no effect in breaking or resolving oil field emulsions, and are not used commercially as demulsifying agents.

It is generally recognized that the persistence of an emulsion is due largely to a plastic emulsifying film or encasement of matter surrounding the dispersed phase, and that the effectiveness of many chemical treating agents or demulsifying agents is due to their ability to react with or to modify, destroy, or otherwise render ineffective the emulsifying film, or some vital element of the emulsifying film. In order to accomplish this result, it is generally necessary for the chemical treating agent or demulsifying agent to reach and preferably to segregate at the interface, i. e., at the same place where the encasement of matter exists. Some demulsifying agents exhibit the property of segregating at the interface to a greater degree than other demulsifying agents. The ability to segregate at the interface is especially characteristic of colloids. Thus, everything else being equal, it is desirable that the demulsifying agent come within the zone of maximum colloidality.

In recent years, chemical treating agents or demulsifying agents for breaking petroleum emulsions, have been produced extensively from classes of materials which are characterized by the fact that either the majority of the members of the classes are not water softeners, or else at least part of the members of the classes are not water softeners. Accordingly, there are now available for use in the art of resolving petroleum emulsions, treating materials which are characterized by the fact that they do not precipitate with either water-soluble calcium or magnesium salts, said materials also being characterized by the fact that they do not salt out readily by means of solutions of water-soluble salts, such as sodium sulfate or sodium chloride, especially in lower concentrations.

Generally, the treating materials or chemical compounds just referred to are used in the form of acids, salts, or esters, and particularly, in the form of sodium, potassium, or ammonium salts. They are used almost invariably in the form of water-soluble salts. They have a moderately high molecular weight, ranging in general from a value of 150 to a value of about 450. These chemical compounds are polar in the sense that they represent a heterogeneous molecule consisting of a hydrophobe residue and a strongly hydrophile residue, i. e., a sulfo group or residue. The hydrophobe residue may be an aromatic nucleus, such as a naphthalene nucleus with a side chain, such as a propyl radical; it may be a fatty acid residue; it may be a hydrocarbon residue in the case of certain petroleum sulfonic acids or certain sulfated alcohols; or it may be a combination of a fatty hydrocarbon chain and another aliphatic residue or another aromatic residue. The above described treating materials or compounds are all characterized by being surface-active in the sense that their aqueous solution or sol is highly colloidal; they have a tendency to produce a froth or foam, and they are readily adsorbed from their aqueous solutions. Specific examples of said materials are the acid sodium salt of oleic acid hydrogen hydrogen sulfate, described for a purpose other than breaking emulsions, in U. S. Letters Patent No. 1,894,759, to Melvin De Groote and Arthur F. Wirtel, dated January 17, 1933; and lignin sulfonic acid salts in the form of concentrated wood sulfite liquor, described in U. S. Letters Patent No. 1,766,057, to Melvin De Groote and Louis T. Monson, dated January 24, 1930.

The material or compound that I prefer to use as the treating agent or demulsifying agent of my improved process herein described, is prepared from or by the use of organic compounds capable of being employed for breaking petroleum emulsions, and comprising the following substances, to wit: Alkylated, polycyclic, aromatic, sulfonic acid salts, especially propylated or butylated naphthyl sulfonic acid salts, as described in U. S. Letters Patent No. 1,944,021, to John Charles Walker, dated January 16, 1934; sulfo-derivatives of alcohols, such as sulfuric acid esters of tetradecyl alcohol, lauryl alcohol, cetyl alcohol, oleyl alcohol, octyl alcohol, etc., as described in U. S. Letters Patent No. 1,938,322, to Melvin De Groote and Louis T. Monson, dated December 5, 1933; No. 1,938,323, to Melvin De Groote, dated December 5, 1933; and No. 1,943,815, to Melvin De Groote, dated January 16, 1934; sulfo-aliphatic esters of fatty acids, as described in U. S. Letters Patent No. 1,988,835, to Melvin De Groote and Arthur F. Wirtel, dated January 22, 1935; and sulfo-aromatic esters of fatty acids, as described in U. S. Letters Patent No. 1,954,585, to Melvin De Groote and Bernhard Keiser, dated April 10, 1934. I have found that if an aqueous solution of non-water-softening demulsifying agents of the kind above referred to is contacted with finely-divided, inorganic precipitates, produced under specified conditions, that these surface-active reagents appear to absorb very largely on such freshly precipitated, inorganic solids, and thus one obtains a greater effectiveness, since the combination yields the equivalent of a solution or sol of greater colloidality.

It is to be noted that some of the above-mentioned organic, demulsifying agents, in addition to being water-soluble, are also oil-soluble, as in the case of certain oil and water-soluble petroleum sulfonic acids or their salts which do not precipitate with water-soluble alkaline earth salts, and more especially in the case of sulfo-aliphatic esters of fatty acids previously referred to. In preparing or producing the treating agent contemplated by my present process I prefer to use a water-soluble, organic compound that does not exhibit any appreciable oil-solubility, as in the case of the sodium salt of isopropyl beta naphthyl sulfonic acid. As an example, one may prepare a 1% solution of sodium isopropyl beta naphthyl sulfonic acid salt, and employ it as a satisfactory demulsifying agent for many emulsions of moderate tenacity at a ratio of 1 to 5,000 net. If, for example, the emulsion consists of equal parts of brine and oil, one part of this substance will resolve or break 10,000 parts of emulsion, so as to recover 5,000 parts of dehydrated or dry oil. It may be used in the form of a 1% solution, and thus 100 parts of 1% solution are thoroughly admixed with 10,000 parts of the emulsion as produced. However, if one adds relatively small amounts of a water-soluble calcium salt, such as calcium chloride, to the 1% solution of the alkylated naphthalene sulfonic acid salt previously described and then adds sodium carbonate, so as to produce a colloidal precipitate of calcium carbonate in presence of the dissolved alkylated naphthalene sulfonic acid salt, and employs such a sol or suspension or pasty mass, the said mixture in some instances may be twice as effective or even three times as effective as the alkylated aromatic compound solution alone. I have found that it is generally desirable to have approximately one-half to ten times as much inert, inorganic, water-insoluble material present as the associated organic demulsifying agent. I have not found any emulsions that are susceptible to treatment by means of the inorganic, freshly precipitated material alone, at least within any range approaching commercial ratios. These materials are referred to as being inert, in the sense that they are not active demulsifiers. I believe said materials simply act as suitable carriers and to give the proper colloidal structure and nothing more. In event that an inorganic salt is added, I prefer to use calcium chloride or magnesium sulfate, due to its low cost. Magnesium chloride may also be used. Assuming that the organic demulsifying agent is used in approximately ½% to 2% concentration, I prefer to add ¼% to 10% of the water-soluble, inorganic salt and subsequently add a suitable amount of some other inorganic precipitating salt, such as sodium carbonate, calcium oxide, or the like, to precipitate an inorganic, water-insoluble solid, such as calcium carbonate, magnesium carbonate, etc.

Practical application of the present process need not involve the addition of two separate inorganic salts to the treating agent, because naturally-occurring oil field brines, which are always available, represent a satisfactory solution of alkaline earth salts. A practical manner of practising my present process is simply to prepare a $\frac{1}{10}$% to 2% solution of the organic demulsifying agents of the kind described in a naturally-occurring oil field brine as a solvent, and then add sufficient sodium carbonate or similar inorganic water-softening agent to precipitate at least part of the naturally-occurring hardiness which may be equivalent to about 10,000 to 50,000 parts per million of calcium carbonate. It is intended, of course, only to re-act on the brine used for preparing the solution, and not to soften the brine in the emulsion. Oil field brines may vary in hardness of approximately 1,000 to 3,000 parts per million in some instances, to a more common value of 10,000 to 25,000 parts per million, and in some cases 50,000 parts per million is not unknown. It is not necessary to add enough sodium carbonate or the like to precipitate all this hardness, but simply enough to produce an adequate precipitate, which, in a general manner, would represent hardness equivalent as calcium carbonate equal in weight to about one-half to ten times the amount of the organic demulsifying agent present.

If the demulsifying agent is added to the oil field brine so as to give the concentration of 1/10th to 1%, then it is present at a ratio of 1,000 parts per million, and one would usually add enough sodium carbonate to precipitate at least 500 parts of equivalent calcium carbonate per million, or one might even precipitate as much as 10,000 parts of calcium carbonate per million. If the solution of the organic demulsifying agent is employed in a 1% concentration, it is present to the extent of 10,000 parts per million, and in this case, one would prefer to precipitate at least 5,000 parts per million of hardness and perhaps as much as 25,000 parts per million of hardness based on calcium carbonate.

It is not necessary, of course, that the inorganic precipitate be produced by the formation of insoluble calcium or magnesium salts, but it can also be produced by the formation of an insoluble sulfate, such as barium sulfate, provided that the naturally-occurring brine contains soluble sulfates in solution by addition of barium chloride. In other instances, where there are bicarbonates in solution, a soluble hydrate such as caustic soda or milk of lime may be employed to produce the precipitate. Iron or aluminum salts, if present, could be precipitated as hydroxides, if desired, and thus employed.

The sol or suspension thus prepared, representing a precipitate on which there is adsorbed the organic demulsifying agent may be used in any suitable manner, such as is now employed in resolving petroleum emulsions. It may be added directly to a tank of emulsion, or may be pumped into a flow line through which an emulsion is passing. The present process is particularly adapted for treatment of emulsions which are accompanied by large amounts of free or unemulsified water. It is obvious in such instances, that a water-soluble demulsifying agent, particularly if oil-insoluble, and especially, if it does not precipitate with water-soluble calcium and magnesium salts, may be dissipated to a large degree without being effective on the emulsified brine, as distinguished from the free water.

The inorganic precipitate as formed, together with its adsorbed organic emulsifying agent, may be separated from the supernatant liquid, or may be concentrated, and the more concentrated milk or paste or slurry may be employed.

In some instances, the water-insoluble, inert, inorganic compound which is formed may occlude enough gas or air that it will tend to rise to the top along with the adsorbed film of organic demulsifying agent, instead of settling at the bottom. Naturally, if agitation is employed, to give uniform distribution throughout, such suspension can be used just as readily as if the inert, inorganic compound happened to be heavier than water. However, if the inert, inorganic compound, together with its adsorbed film, is to be withdrawn and used as a concentrated paste or milk, then this can be accomplished by draining or withdrawing the lower layer of clarified liquid from the bottom of the container.

In some instances, a desirable application of the present process is in recovering the unused part of a demulsifying agent which has previously been employed to break an emulsion. For example, if an oil field emulsion containing a relatively large amount of water, for example, 80% of water or brine, and 20% of oil, is treated or broken with a demulsifying agent, such as a sodium salt of isopropyl beta naphthyl sulfonic acid, it will be found that the lower aqueous layer which separates from the emulsion will still contain, in many instances, a valuable amount in rather dilute form, of the original demulsifying agent. The solution of the demulsifying agent in this draw-off brine is too dilute to be re-used economically, and in many instances, it is impossible to re-emulsify such a large quantity of brine with fresh emulsion for the purpose of effectually using the residual demulsifying agent. For instance, if a crude oil emulsion containing 80 parts of water and 20 parts of emulsion, is treated at a gross ratio of 1 to 15,000 by means of the sodium salt of isopropyl beta naphthyl sulfonic acid, then as a result of demulsification, there is produced 3,000 parts of dehydrated oil and 12,000 parts of brine. The demulsifying agent may have been used as a one percent solution, and in that event, the intimate mixing of 100 parts of aqueous solution with 15,000 parts of emulsion does not present any undue difficulties. However, assuming that the 12,000 parts of draw-off water still contain an appreciable and valuable amount of the effective demulsifying agent, it is substantially impossible to conveniently mix this large amount of solution with 15,000 parts of fresh emulsion of such high water content in order to treat the same.

It is evident that the present process is readily adapted to such a situation. The 12,000 parts of brine previously referred to (if containing an appreciable amount of the original demulsifying agent) may be treated with approximately 2% to 5% of sodium carbonate, and a precipitate of calcium and magnesium carbonates produced. The residual organic demulsifying agent present (sodium salt of isopropyl naphthyl sulfonic acid) will be largely adsorbed on the inorganic precipitate. The suspension or sol may be allowed to stand until the precipitate settles to form a lower layer approximating about 5% of the sol, or about 750 parts, as compared with 12,000 parts of the original brine. The clear brine can be drawn off, and the inert, inorganic precipitate, together with the adsorbed demulsifying agent, can be pumped into a new batch of emulsion of the same amount as the original, that is, 15,000 parts, thoroughly admixed with the same, and in many instances, will break the fresh emulsion just as effectively as in the first part of the cycle, where the demulsifying agent was added in the absence of an inorganic precipitate. In some instances, it has even been possible to treat an increased amount of emulsion in the second cycle where the inorganic precipitate is present.

It is to be understood that the demulsifying agent, as employed in the present process, that is, in presence of the inorganic precipitate, can be employed in the same manner as is the case where the inorganic precipitate is absent, provided that the presence of the inorganic precipitate does not cause some mechanical difficulty.

It should also be understood that the demulsifying agent, when ready for use, may be mixed with any other suitable demulsifying agent, provided that such a mixture is not incompatible. If, for example, one employed a mixture of the sodium salts of monoisopropyl beta naphthyl sulfonic acid, diisopropyl beta naphthyl sulfonic acid, and triisopropyl beta naphthyl sulfonic acid, then the addition of water or brine containing alkaline earth salts might convert the polypropylated salts into the corresponding calcium or magnesium salts, which may be as effective demulsifying agents as the corresponding sodium salts. In such instance, one could employ a mixture of the propylated sulfonic salts containing an appreciable portion of the monopropylated salt, just as well as the pure monopropylated salt, and the mixture thus obtained could be used just as effectively. In other words, the precipitate obtained by metathesis or decomposition would enhance the effectiveness of the monopropylated, sulfonic acid salts, regardless of whether or not there happened to be sodium, calcium, or magnesium salts of polypropylated naphthyl sulfonic acids present.

I have found that with a treating agent or demulsifying agent of the kind herein described, the most advantageous results are obtained when said treating agent is used in the manner generally referred to as "down-the-hole treatment". Down-the-hole treatment of cutting wells, is effected by conducting a solution or suspension of the demulsifying agent into the well in such a manner that it contacts and admixes with the fluids in the well before said fluids have completed their vertical rise to the surface of the ground and emerged at the well head. I have found it convenient to mix the inorganic precipitating salt (which produces the water-insoluble precipitate with the water-soluble alkaline earth salts of the naturally-occurring brine) with the organic demulsifying agent and then adding such mixture in solution to naturally-occurring brine, so as to obtain the inorganic precipitate, such as magnesium carbonate, calcium carbonate, or basic calcium carbonate, without further manipulation. I have found it convenient to keep such a prepared suspension agitated by means of air or gas, or by means of a mechanical device, such as a small agitating propeller, while the suspension is being pumped, usually by means of a small heavy-duty pump, into the space between the well casing and tubing, or the like, so that it will drop into the bottom of the well or through the oil layer and contact the fluids before their upward travel. I have found it convenient to prepare a solution containing 3% of the sodium salt of isopropyl, beta naphthyl, sulfonic acid and 3% of sodium carbonate in soft water. When both substances are completely dissolved, I add two volumes of naturally-occurring oil field brine having a calcium carbonate hardness of preferably at least 1,500 to 5,000 parts per million. The solutions are agitated during mixture, and the suspension thus obtained is conducted into a well in the manner previously described. Suspension may be kept of uniform composition throughout by agitation in the manner previously referred to.

In a general way, the ratio of organic demulsifying agent to recovered oil, ignoring for simplicity of calculation, the inert, water-insoluble, inorganic material, is approximately 1 to 3,000 to 1 to 10,000, and in the down-the-hole treatment, as previously described, the ratios may be considerably higher, whereas, in the treatment of refractory tank bottoms, the ratios obtainable may be considerably lower.

From the foregoing it will be understood that the inert, inoganic, water-insoluble material with its adsorbed organic demulsifying agent, employed in my present process, is formed by the production of the inert, inorganic precipitate by metathesis or decomposition in presence of an organic demulsifying agent which is adsorbed very strongly and very completely on the freshly precipitated material. I have not found it feasible to form the inert, inorganic compound in a separate container and then add the organic demulsifying agent, because under these conditions it does not appear to be strongly adsorbed. I have not found it satisfactory to obtain the finely-divided material in some manner other than metathesis or decomposition, as, for instance, grinding calcium sulfate in presence of a solution of the organic demulsifying agent. I believe as the inert precipitate is produced by metathesis or decomposition, that it rapidly passes from the range of molecular size to microscopic size, and that at some point during this increase in size, a place is reached where the small particles exhibit the maximum adsorbent power for the water-soluble, organic demulsifying agent present. At this particular stage, the organic demulsifying agent is adsorbed and held, and for this reason, the preparation of the treating agent or demulsifying agent contemplated by my process must be effected or carried out as above described.

As previously stated, the finely-divided inorganic, inert solid is obtained by double decomposition or metathesis. During double decomposition the precipitate obtained, such as calcium carbon or magnesium carbonate, passes from a molecular size to a microscopic size. Similar precipitates which pass through the same particle size range can be obtained in some instances by simple decomposition, as distinguished from double decomposition. Thus, an oil field brine which has a large percentage content of bicarbonate hardness, due to the presence of calcium bicarbonate or magnesium bicarbonate, can be heated or exposed to the atmosphere so as to permit the escape of carbon dioxide with the formation of calcium carbonate or magnesium carbonate. It is to be observed that the calcium carbonate or magnesium carbonate thus formed is produced under conditions substantially identical with its production by metathesis, or double decomposition. For this reason the expression "metathesis", which ordinarily includes reactions involving double decomposition, is herein used to include such reactions involving simple decomposition, insofar that the water-insoluble, inert, inorganic solids produced are substantially identical in both cases. The application of this simple decomposition reaction does not require further explanation, insofar that all that is required is to make a suitable solution of the organic demulsifying agent in the brine having temporary hardness and permitting such solution to be exposed to the atmosphere or heating such solution until a suitable precipitate is formed without the addition of any precipitant.

Having thus described my invention, what I claim as new and desire to secure by Letters Patent is:

1. A process for breaking petroleum emulsions of the water-in-oil type, which consists in subjecting the emulsion to the action of a demulsifying agent comprising an adsorbed combination of a finely-divided, normally inert, water-insoluble, inorganic solid and a polar, surface-active, water-soluble, sulfo, organic, chemical compound, said organic compound being characterized by the fact that its alkaline earth salts are water-soluble, and also characterized by the fact that its molecular weight is within the range of the approximate limits of 150–450, and said adsorbed combination of organic and inorganic compounds being obtained by formation of the inorganic substance by metathesis in presence of the organic compound.

2. A process for breaking petroleum emulsions of the water-in-oil type, which consists in subjecting the emulsion to the action of a demulsifying agent comprising an adsorbed combination of a finely-divided, normally inert, water-insoluble, inorganic solid and a polar, surface-active, water-soluble, oil-insoluble, sulfo, organic, chemical compound, said organic compound being characterized by the fact that its alkaline earth salts are water-soluble, and also characterized by the fact that its molecular weight is within the range of the approximate limits of 150-450, and said adsorbed combination of organic and inorganic compounds being obtained by formation of the inorganic substance by metathesis in presence of the organic compound.

3. A process for breaking petroleum emulsions of the water-in-oil type, which consists in subjecting the emulsion to the action of a demulsifying agent comprising an adsorbed combination of a finely-divided, normally inert, alkaline earth, water-insoluble, inorganic solid and a polar, surface-active, water-soluble, oil-insoluble, sulfo, organic, chemical compound, said organic compound being characterized by the fact that its alkaline earth salts are water-soluble, and also characterized by the fact that its molecular weight is within the range of the approximate limits of 150-450, and said adsorbed combination of organic and inorganic compounds being obtained by formation of the inorganic substance by metathesis in presence of the organic compound.

4. A process for breaking petroleum emulsion of the water-in-oil type, which consists in subjecting the emulsion to the action of a demulsifying agent comprising an adsorbed combination of a finely-divided, normally inert, alkaline earth, water-insoluble, inorganic solid and a polar, surface-active, water-insoluble, oil-insoluble, sulfo, organic, chemical compound, said organic compound being characterized by the fact that its alkaline earth salts are water-soluble, and also characterized by the fact that its molecular weight is within the range of the approximate limits of 150-450, and said adsorbed combination of organic and inorganic compounds being obtained by formation of the inorganic substance from naturally-occurring oil field brines, by metathesis.

5. A process for breaking petroleum emulsions of the water-in-oil type, which consists in subjecting the emulsion to the action of a demulsifying agent comprising an adsorbed combination of a finely-divided, normally inert, alkaline earth, water-insoluble, inorganic solid and a polar, surface-active, water-soluble, oil-insoluble, sulfo, organic, chemical compound, said organic compound being characterized by the fact that its alkaline earth salts are water-soluble, and also characterized by the fact that its molecular weight is within the range of the approximate limits of 150-450, and said adsorbed combination of organic and inorganic compounds being obtained by formation of the inorganic substance by metathesis in presence of an organic compound, and derived in part from naturally-occurring oil field brines, by the action of sodium carbonate.

6. A process for breaking petroleum emulsions of the water-in-oil type, which consists in subjecting the fluids in a well, prior to emerging from the well head, to the action of a demulsifying agent comprising an adsorbed combination of a finely-divided, normally inert, alkaline earth, water-insoluble, inorganic solid and a polar, surface-active, water-soluble, oil-insoluble, sulfo, organic, chemical compound, said organic compound being characterized by the fact that its alkaline earth salts are water-soluble, and also characterized by the fact that its molecular weight is within the range of the approximate limits of 150-450, and said adsorbed combination of organic and inorganic compounds being obtained by formation of the inorganic substance by metathesis in presence of an organic compound, and derived from naturally-occurring oil field brines, by the action of sodium carbonate.

7. A process for breaking petroleum emulsions of the water-in-oil type, which consists in subjecting the fluids in a well, prior to emerging from the well head, to the action of a demulsifying agent comprising an adsorbed combination of a finely-divided, normally inert, alkaline earth, water-insoluble, inorganic solid and an alkylated, polycyclic, sulfonic acid body, said organic compound being characterized by the fact that its alkaline earth salts are water-soluble and also characterized by the fact that its molecular weight is within the approximate range limits of 150-450, and said adsorbed combination of organic and inorganic compounds being obtained by formation of the inorganic substance by metathesis in presence of said organic compound, and derived from naturally-occurring oil field brines, by the action of sodium carbonate.

8. A process for breaking petroleum emulsions of the water-in-oil type, which consists in subjecting the fluids in a well, prior to emerging from the well head, to the action of a demulsifying agent comprising an adsorbed combination of a finely-divided, normally inert, alkaline earth, water-insoluble, inorganic solid, and an alkylated, polycyclic, sulfonic acid salt, said organic compound being characterized by the fact that its alkaline earth salts are water-soluble and also characterized by the fact that its molecular weight is within the approximate range limits of 150-450, and said adsorbed combination of organic and inorganic compounds being obtained by formation of the inorganic substance by metathesis in presence of said organic compound and derived from naturally-occurring oil field brines, by the action of sodium carbonate.

9. A process for breaking petroleum emulsions of the water-in-oil type, which consist in subjecting the fluids in a well, prior to emerging from the well head, to the action of a demulsifying agent comprising an adsorbed combination of a finely-divided, normally inert, alkaline earth, water-insoluble, inorganic solid, and a propylated, polycyclic, sulfonic acid salt, said organic compound being characterized by the fact that its alkaline earth salts are water-soluble and also characterized by the fact that its molecular weight is within the approximate range limits of 150-450, and said adsorbed combination of organic and inorganic compounds being obtained by formation of the inorganic substance by metathesis in presence of said organic compound, and derived from naturally-occurring oil field brines, by the action of sodium carbonate.

10. A process for breaking petroleum emulsions of the water-in-oil type, which consists in subjecting the fluids in a well, prior to emerging from the well head, to the action of a demulsifying agent comprising an adsorbed combination of a finely-divided, normally inert, alkaline earth, water-insoluble, inorganic solid, and a propylated, polycyclic, sulfonic acid sodium salt, said organic compound being characterized by the fact that its alkaline earth salts are water-soluble and also characterized by the fact that its molecular weight is within the approximate range limits of 150-450, and said adsorbed combination of organic and inorganic compounds being obtained by formation of the inorganic substance by metathesis in presence of said organic compound, and derived from naturally-occurring oil field brines, by the action of sodium carbonate.

11. A process for breaking petroleum emulsions of the water-in-oil type, which consist in subjecting the fluids in a well prior to emerging from the well head, to the action of a demulsifying agent comprising an adsorbed combination of a finely-divided, normally inert, alkaline earth, water-insoluble, inorganic solid, and a monopropylated, naphthalene, sulfonic acid, sodium salt, characterized by the fact that its alkaline earth salts are water-soluble and said adsorbed combination of organic and inorganic compounds being obtained by formation of the inorganic substance by metathesis in presence of said organic compound, and derived from naturally-occurring oil field brines, by the action of sodium carbonate.

MELVIN DE GROOTE.